US010736263B2

(12) United States Patent
Horeth et al.

(10) Patent No.: US 10,736,263 B2
(45) Date of Patent: Aug. 11, 2020

(54) CONTROLLED-RELEASE SPREADER (71) Applicant: Chapin Manufacturing, Inc., Batavia, NY (US)

(72) Inventors: Ed Horeth, Rochester, NY (US); David Dubiel, N. Chili, NY (US); William James Campbell, Akron, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 84 days.

(21) Appl. No.: 15/963,669

(22) Filed: Apr. 26, 2018

(65) Prior Publication Data
US 2019/0327884 A1    Oct. 31, 2019

(51) Int. Cl.
*A01C 17/00* (2006.01)
*E01H 10/00* (2006.01)
*A01C 15/02* (2006.01)
*E01C 19/20* (2006.01)

(52) U.S. Cl.
CPC .......... *A01C 17/001* (2013.01); *A01C 17/005* (2013.01); *E01H 10/007* (2013.01); *A01C 15/02* (2013.01); *E01C 19/203* (2013.01)

(58) Field of Classification Search
CPC ..... A01C 17/001; A01C 17/005; A01C 15/02; E01H 10/007; E01C 19/203
USPC ................. 239/685, 687, 679, 683
See application file for complete search history.

(56) References Cited

U.S. PATENT DOCUMENTS

| | | | | |
|---|---|---|---|---|
| 2,941,811 A | * | 6/1960 | Sherer .................... | A01C 7/085 239/685 |
| 3,041,076 A | * | 6/1962 | Van Der Lely ........ | A01C 17/00 239/654 |
| 3,394,892 A | * | 7/1968 | Speicher ............... | E01C 19/203 239/683 |
| 3,979,071 A | * | 9/1976 | Biggs, Jr. ............... | A01C 15/02 239/653 |
| 4,106,704 A | * | 8/1978 | McRoskey ............. | A01C 15/02 222/625 |
| 4,597,531 A | * | 7/1986 | Kise ...................... | A01C 17/006 239/650 |
| 4,609,151 A | * | 9/1986 | Crowley .............. | A01C 15/005 222/136 |
| 4,609,153 A | * | 9/1986 | van der Lely ....... | A01C 17/008 222/482 |
| 5,054,693 A | * | 10/1991 | Chow ...................... | A01C 7/02 239/681 |

(Continued)

Primary Examiner — Joseph A Greenlund
(74) Attorney, Agent, or Firm — Wood Oviatt Gilman LLP; Katherine H. McGuire, Esq.

(57) ABSTRACT

A spreader includes a frame having wheels mounted on an axle. A gear assembly on the axle is coupled with a shaft. A hopper is mounted on the frame and holds particulate that empties through an opening within the bottom wall. An impeller is mounted on the shaft and receives the particulate emptied from the hopper. A controlled-release assembly is mounted about the shaft and includes a drive housing secured to the hopper. The drive housing has a funnel opening to dispense the particulate therethrough. A transfer wheel within the drive housing is rotatably coupled to the shaft. When the shaft is rotating, the transfer wheel rotates whereby the particulate is delivered to the funnel. When the shaft is stationary, the transfer wheel is stationary whereby particulate is not delivered to the funnel.

12 Claims, 13 Drawing Sheets

(56) References Cited

U.S. PATENT DOCUMENTS

| | | | | |
|---|---|---|---|---|
| 5,340,033 A * | 8/1994 | Whitell | A01C 15/007 239/661 |
| 5,626,260 A * | 5/1997 | Waldner | G01F 11/24 222/144 |
| 5,641,011 A * | 6/1997 | Benedetti, Jr. | B65B 1/06 137/614.02 |
| 6,135,036 A * | 10/2000 | Speicher, III | A01C 15/02 111/11 |
| 6,138,927 A * | 10/2000 | Spear | A01C 15/02 239/666 |
| 6,422,490 B1 * | 7/2002 | Truan | A01C 15/18 239/659 |
| 6,499,679 B1 * | 12/2002 | Woodruff | A01C 15/02 239/650 |
| 6,907,832 B2 * | 6/2005 | Wyne | A01C 17/001 111/130 |
| 6,945,481 B2 * | 9/2005 | Thompson | A01C 7/08 239/650 |
| 7,040,556 B2 * | 5/2006 | Jones | A01C 17/001 222/610 |
| 7,063,280 B1 * | 6/2006 | Bogart | A01C 17/008 239/505 |
| 8,474,735 B2 * | 7/2013 | Hobbs, Jr. | A01C 15/006 239/650 |
| 9,192,094 B2 * | 11/2015 | Kendall | B05B 7/1404 |
| 10,225,976 B2 * | 3/2019 | Kendall | A01C 15/02 |
| D853,446 S * | 7/2019 | Horeth | D15/13 |
| 2002/0179750 A1 * | 12/2002 | Truan | E01C 19/204 239/679 |
| 2005/0274832 A1 * | 12/2005 | Bowsher | A01C 17/001 239/683 |
| 2008/0078850 A1 * | 4/2008 | Bowsher | A01C 17/008 239/687 |
| 2009/0277979 A1 * | 11/2009 | Cichy | A01C 17/003 239/683 |
| 2015/0284922 A1 * | 10/2015 | Phelps | B65D 88/66 239/7 |
| 2015/0315759 A1 * | 11/2015 | Delorme | B05B 3/1007 239/683 |
| 2018/0235142 A1 * | 8/2018 | Schoels | A01C 7/085 |
| 2019/0047004 A1 * | 2/2019 | Anderson | B05B 9/007 |
| 2019/0099779 A1 * | 4/2019 | Farmer | A01C 17/001 |
| 2019/0116724 A1 * | 4/2019 | Lefebvre | A01C 17/001 |

* cited by examiner

CONTROLLED-RELEASE SPREADER

FIELD OF THE INVENTION

The present invention generally relates to spreader systems, and more particularly to a broadcast particulate spreader, and still more particularly to a controlled-release broadcast particulate spreader wherein particulate is dispersed only when the spreader is moving.

BACKGROUND OF THE INVENTION

Spreaders, such as broadcast spreaders are used across an array of applications, including farms, golf courses and residential properties, to apply particulate, such as grass seed, fertilizers, snow and ice salt/sand and the like. As such, these spreaders may need to cover a large area. To apply particulate material to these large areas, broadcast spreaders generally include a hopper, impeller, shaft and two wheels supported by an axle. The hopper holds a large volume of material which is funneled to an outlet such that the material may fall onto the impeller. A gear assembly is mounted on the axle between the wheels whereby rotation of the axle along a horizontal axis is translated to rotation of the shaft along a vertical axis. The impeller is mounted on the shaft such that rotation of the shaft causes rotation of the impeller. As a result, the impeller may then cast the particulate material across the coverage area. Locomotion of the spreader may be manual, such through use of a push bar, or mechanical, such as through mounting the spreader to a tractor, all-terrain vehicle (ATV) or other similar vehicle.

One drawback to these systems, however, is that the particulate matter continues to fall through the outlet onto the impeller even when the spreader is not moving. As a result, the particulate material builds up on the impeller, and may even overflow the impeller and fall directly on the grass/surface. The material build-up will then be immediately dispersed once the spreader is again moving. However, the volume of material immediately dispersed will be significantly larger than during the remainder of the spreading operation. This large amount of material may be damaging to the grass/surface and also results in a waste of material, thereby increasing cost of operation. This drawback also leads to a further waste of time and/or material. For instance, a user may load the hopper with a volume of material estimated to complete the intended task. However, if the task is completed with material still in the hopper, a user may simply continue the spreading operation until the hopper is emptied rather than attempting to pour the unused material from the hopper into a container, thereby wasting material and incurring additional time to empty the hopper. Conversely, if too little material was added, the user will be forced to reload the hopper, taking time, and then continue operation until the hopper is empty, as described above.

To alleviate the above drawback, spreader systems have been developed whereby a shut off plate is positioned proximate the discharge opening of the hopper. While such systems may mitigate waste of material by closing the hopper discharge when material is not to be dispersed, these systems are tedious as an operator must continually manually adjust the shut off plate to open and close the discharge openings of the hopper, particularly when using a tow-behind spreader. Alternatively, mechanical systems have been designed which have a powered actuator which selectively opens or closes the shut off plate. However, such systems are costly and have a large number of moving parts. Actuation of the shut off plate via a battery may also require manual input of the operator.

Thus, there remains a need for a spreader that can broadcast particulate while the spreader is moving but automatically prevent unwanted build-up of material on the impeller when the spreader is stationary. The present invention satisfies this as well as other needs.

SUMMARY OF THE INVENTION

In view of the above and in accordance with an aspect of the present invention, a spreader configured to disperse particulate matter includes a frame having wheels rotatably mounted on an axle. A gear assembly is arranged on the axle an intermediate distance between the wheels. A shaft is coupled to the gear assembly at a first end. The shaft is configured to rotate about a first axis of rotation when the axle rotates about a second axis of rotation. In one aspect of the present invention, the first axis of rotation is perpendicular to the second axis of rotation. A hopper is mounted on the frame with a second end of the shaft extending through a bottom wall of the hopper to terminate within a cavity defined by the hopper. The hopper is configured to hold the particulate matter whereby the particulate matter empties from the hopper through a hopper opening defined within the bottom wall. An impeller is mounted on the shaft between the gear assembly and the hopper and is configured to receive the particulate matter emptied from the hopper. A controlled-release assembly is mounted about the shaft between the hopper and the impeller. The controlled release assembly includes a drive housing secured to the hopper. The drive housing defines a funnel having a funnel opening configured to dispense the particulate matter therethrough to the impeller. A transfer wheel is received within the drive housing and is coupled to the shaft whereby rotation of the shaft rotates the transfer wheel. When the shaft is rotating, the transfer wheel rotates whereby the particulate matter from the hopper is delivered to the funnel of the drive housing. When the shaft is stationary, the transfer wheel is stationary whereby particulate matter from the hopper is not delivered to the funnel of the drive housing.

In a further aspect of the present invention, the controlled-release assembly further includes a funnel cover mounted to the drive housing and defines a cover opening therein. The cover opening is configured to coincide with the hopper opening. Still further, the controlled-release assembly may include a rotary gate that is mounted to the funnel cover and defines a gate opening therein. The rotary gate is selectively positionable between a fully open position whereby the gate opening fully coincides with the cover opening and hopper opening, and a fully closed position whereby the rotary gate fully occludes the cover opening and hopper opening. In one aspect of the present invention, the rotary gate is selectively positionable in a partially occluded position whereby the gate opening partially overlaps with the cover opening and hopper opening.

In still another aspect of the present invention, the funnel cover includes a cover extension configured to extend outwardly beyond a side wall of the drive housing. The cover extension includes a slot defined therein and the rotary gate includes a handle portion adapted to overlap a portion of the cover extension with the handle portion having a tab configured to travel within the slot. A sidewall defining the slot may have a scalloped profile defining a plurality of notches while the tab is dimensioned to selectively reside within one of the plurality of notches at a time.

In another aspect of the present invention, the spreader may further include an agitator fixedly secured to the second end of the shaft with the agitator residing within the hopper cavity and configured to prevent agglomeration of the particulate matter within the hopper. Additionally, the frame may include a hitch coupling configured to mount to a vehicle-borne receiver or a push/pull bar configured to be grasped by a user.

In still a further aspect of the present invention, the drive housing may include an elliptical mounting sidewall configured to mount to the hopper and a conical funnel sidewall depending downwardly from the mounting sidewall and defining the funnel. A first portion of the conical funnel sidewall coincides with a first portion of the elliptical mounting sidewall whereby the funnel opening is located at or proximate to a vertical axis passing through a focus of the elliptical mounting sidewall. A remaining second portion of the conical funnel sidewall is coupled to a remaining second portion of the elliptical mounting sidewall by a planar bottom wall. The planar bottom wall may be perpendicular to the elliptical mounting sidewall. Still further, the transfer wheel may have a circular side edge and may be received within the drive housing whereby a portion of the transfer wheel lies adjacent to the bottom planar wall with a portion of the side edge proximate the second portion of the elliptical mounting sidewall. A remaining portion of the transfer wheel may then extend over a portion of the funnel.

Additional objects, advantages and novel aspects of the present invention will be set forth in part in the description which follows, and will in part become apparent to those in the practice of the invention, when considered with the attached figures.

BRIEF DESCRIPTION OF THE DRAWINGS

Corresponding reference characters indicate corresponding parts throughout the several views. The exemplifications set out herein illustrate currently preferred embodiments of the invention, and such exemplifications are not to be construed as limiting the scope of the invention in any manner.

DETAILED DESCRIPTION OF THE PREFERRED EMBODIMENTS

Figure 1:
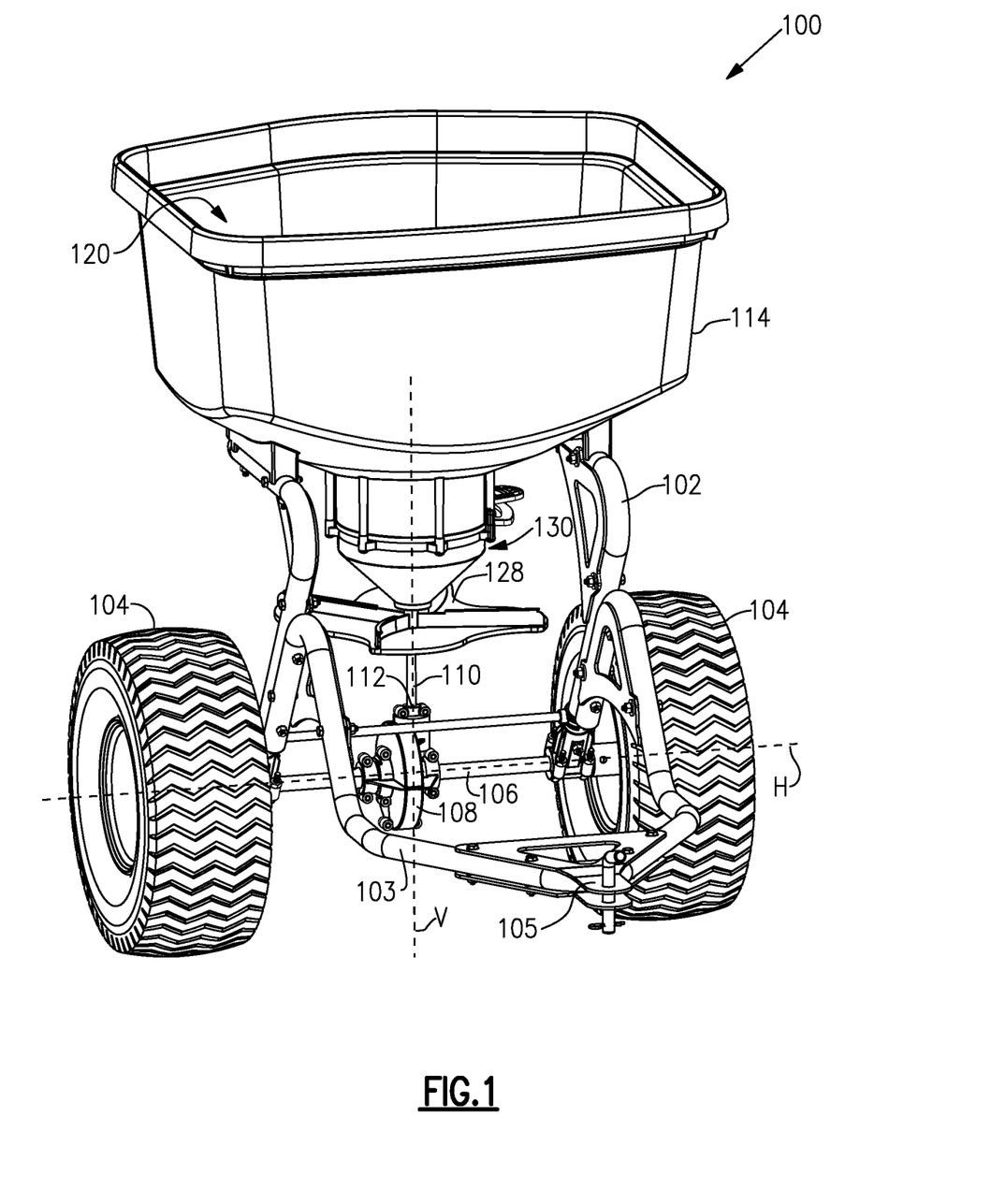
FIG. 1 is a perspective view of a spreader in accordance with an aspect of the present invention.
Figure 1A:
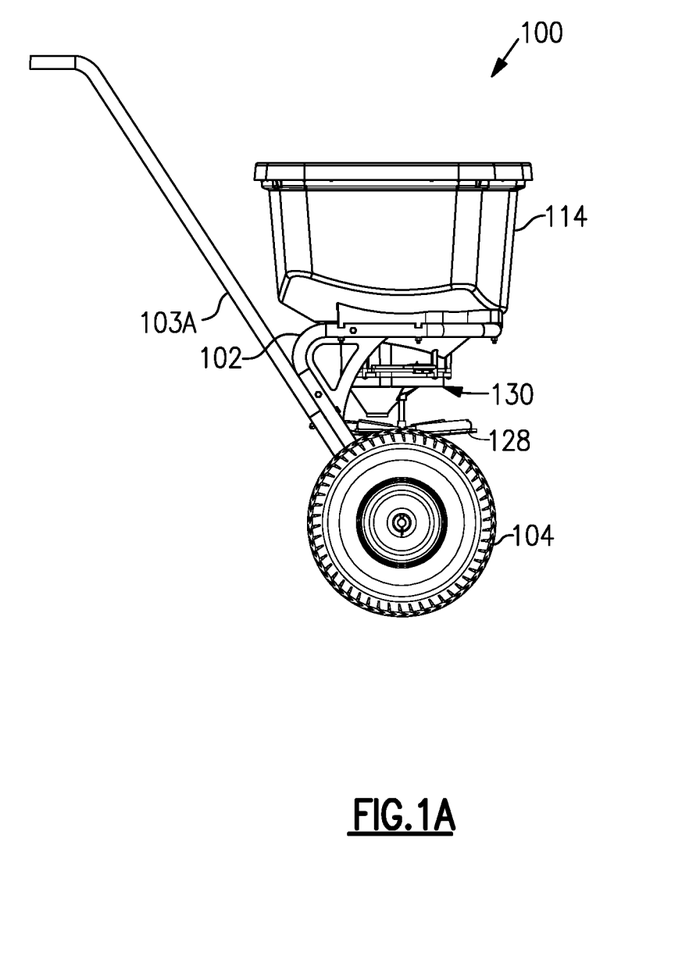
FIG. 1A is a perspective view of a spreader in accordance with another aspect of the present invention.
Figure 2:
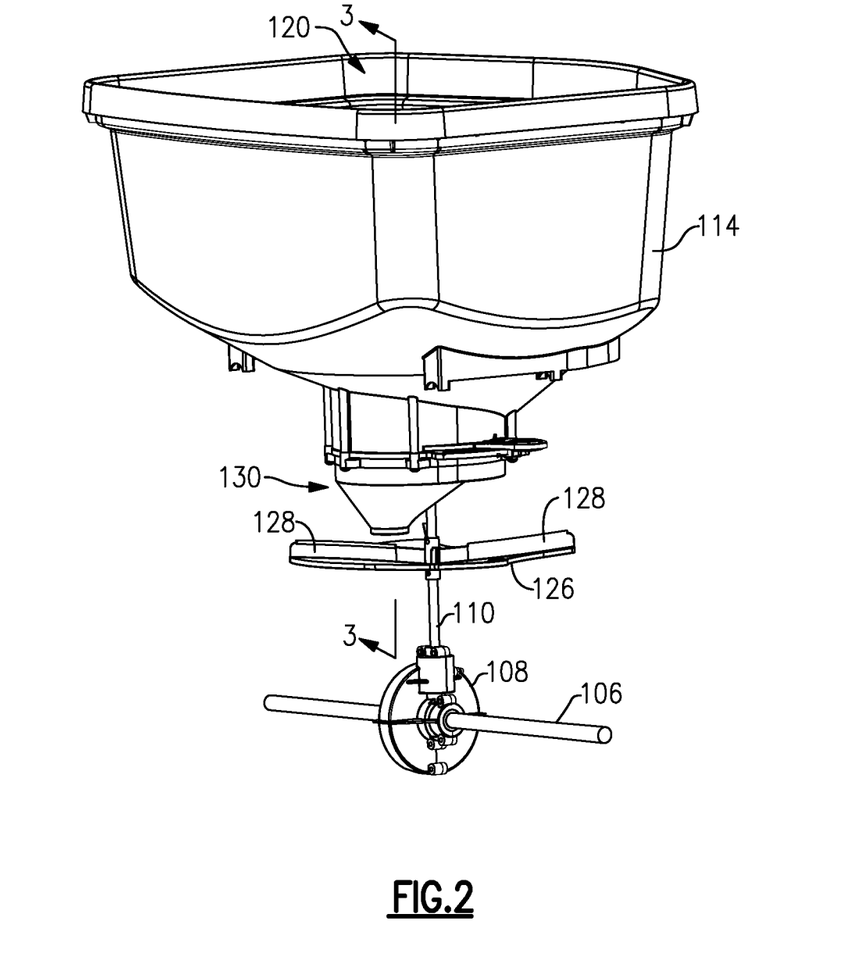
FIG. 2 is a perspective view of the spreader shown in FIG. 1 with the frame and wheels removed.
Figure 3:
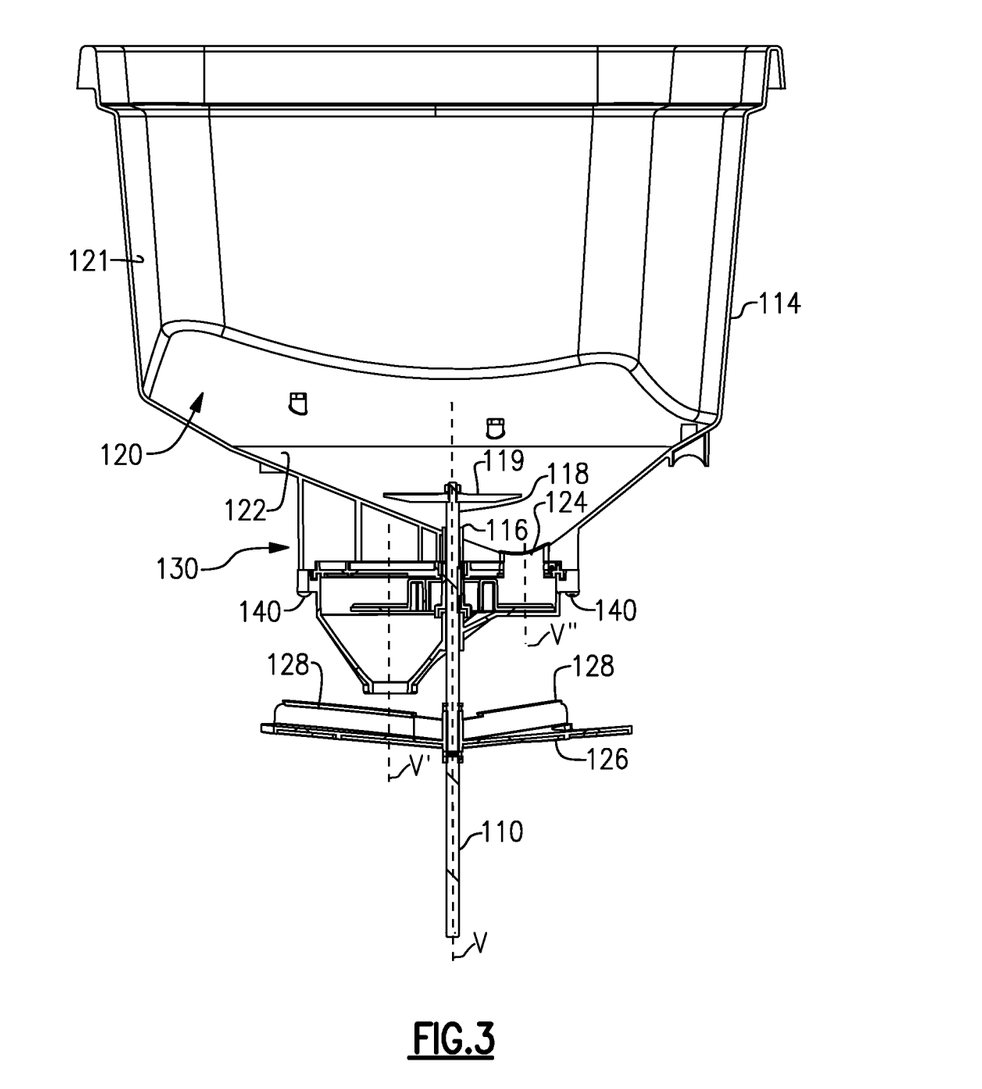
FIG. 3 is a cross section view of the spreader shown in FIG. 2, taken generally along line 3-3 in FIG. 2.
Figure 4:
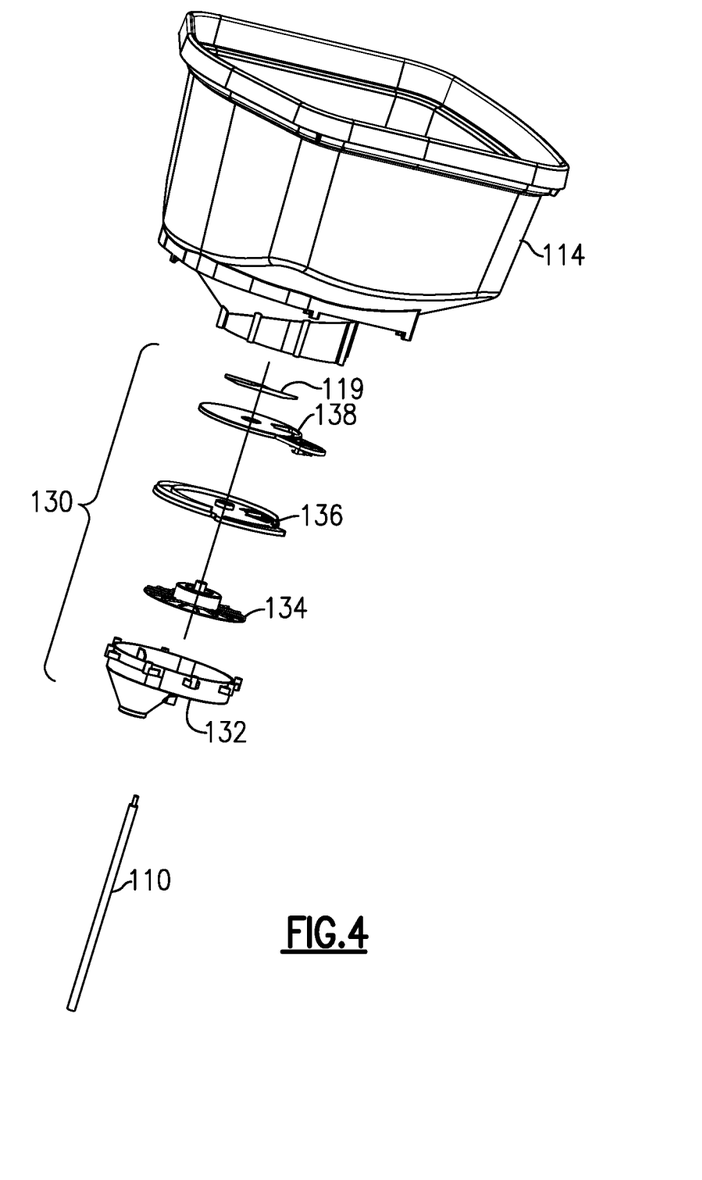
FIG. 4 is an exploded view of the spreader shown in FIG. 3 with the impeller omitted.

Referring now to FIGS. 1 and 1A, with additional reference to FIGS. 2-4, a spreader 100, in accordance with an aspect of the present invention, generally comprises a frame 102 having wheels 104 mounted on an axle 106. Gear assembly 108 is arranged on axle 106 an intermediate distance between wheels 104. Shaft 110 is coupled to gear assembly 108 at a first end 112 such that rotation of axle 106 about horizontal axis H causes shaft 110 to rotate about vertical axis V. In accordance with one aspect of the present invention, axis H is perpendicular to axis V, although it should be understood by those skilled in the art that other orientations of shaft 110 to axle 106 may result in non-perpendicular axes of rotation. As shown in FIG. 1, frame 102 may be configured to mount a hitch carriage 103 including a hitch coupling 105. Hitch coupling 105 may then mount to a corresponding receiver (not shown) on a vehicle, such as a tractor, ATV or other similar vehicle for tow-behind spreading applications. Alternatively, frame 102 may be configured to mount a push/pull bar 103A whereby a user may manually push and/or pull spreader 100 to disperse material.

Figure 5:
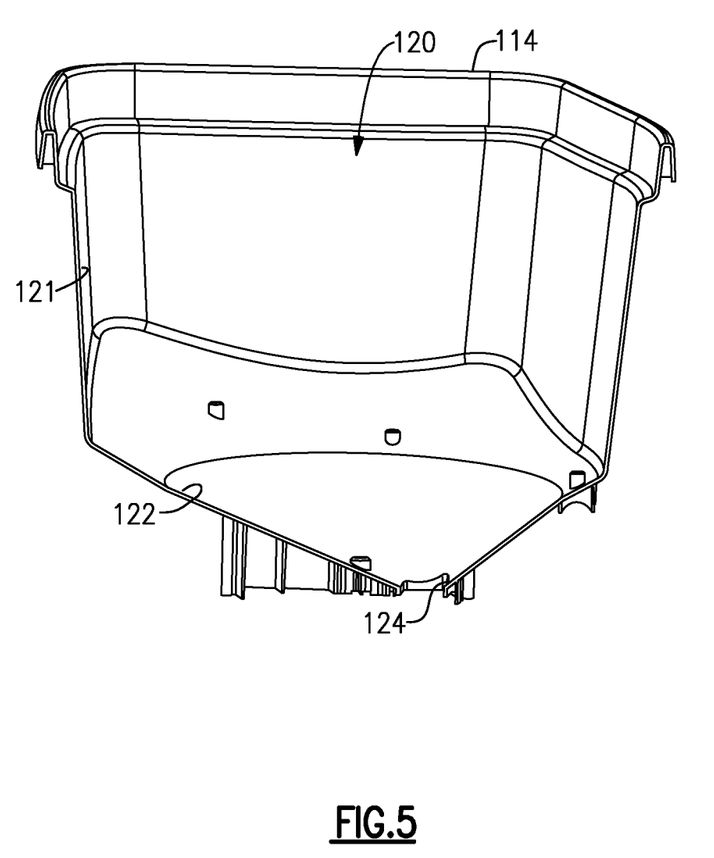
FIG. 5 is an isolated cross section view of a hopper shown in FIG. 3.

With continued reference to FIGS. 1-4, a hopper 114 is mounted onto frame 102 and includes a shaft orifice 116 through which second end 118 of shaft 110 passes whereby shaft 110 terminates within open cavity 120 defined by hopper sidewall 121 and bottom wall 122. Open cavity 120 is configured to receive particulate matter therein, such as grass seed, fertilizer, rock salt and the like. With additional reference to FIGS. 3 and 5, bottom wall 122 of hopper 114 may have a sloped profile relative to the ground such that particulate material may flow via gravity toward, and eventually out of, hopper opening 124 defined at the bottom of the slope. An agitator 119 may be secured to second end 118 of shaft 110 whereby rotation of shaft 110 rotates agitator 119. In this manner, agitator 119 may prevent clumping or aggregation of the particulate matter within open cavity 120. Agitator 119 may also encourage movement of material toward hopper opening 124.

Fixedly mounted on shaft 110 is an impeller 126 such that rotation of shaft 110 causes rotation of impeller 126. As a result, particulate matter from hopper 114 may land on impeller 126 and be dispersed through angular momentum imparted to the particulate matter through rotation of impeller 126. To assist in this dispersion, impeller 126 may include one or more vanes 128. One or more of vanes 128 may also be curved to further assist in dispersal of material.

Figure 6:
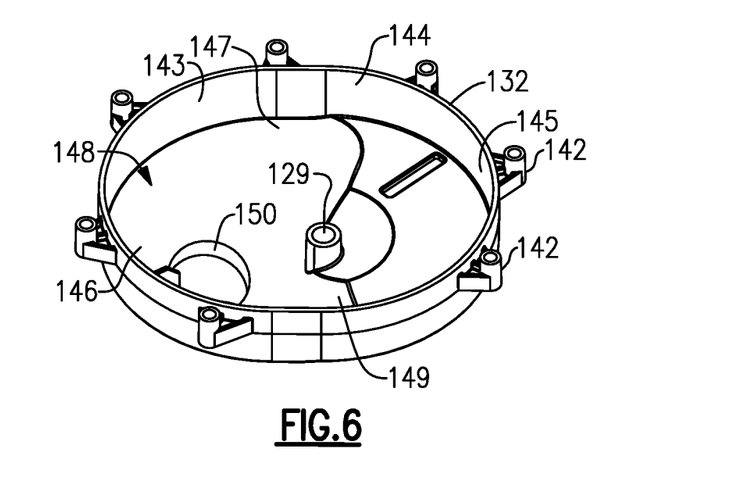
FIG. 6 is an isolated view of a drive housing used within the spreader shown in FIG. 1.
Figure 7:
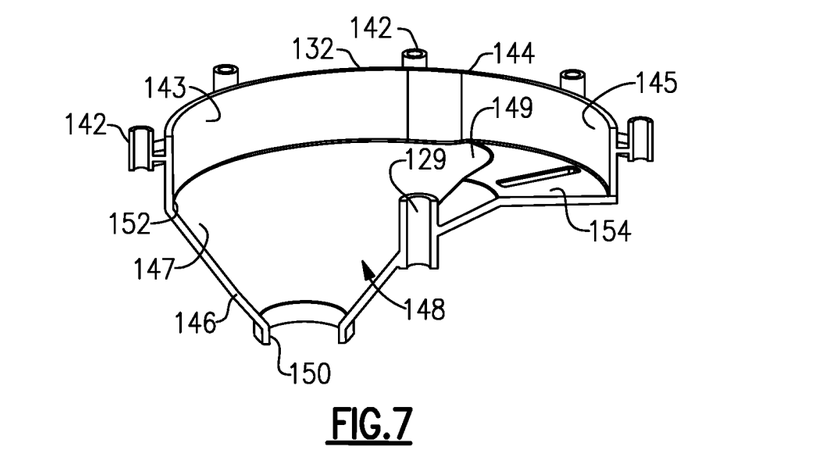
FIG. 7 is an isolated cross section view of the drive housing shown in FIG. 3.
Figure 18:
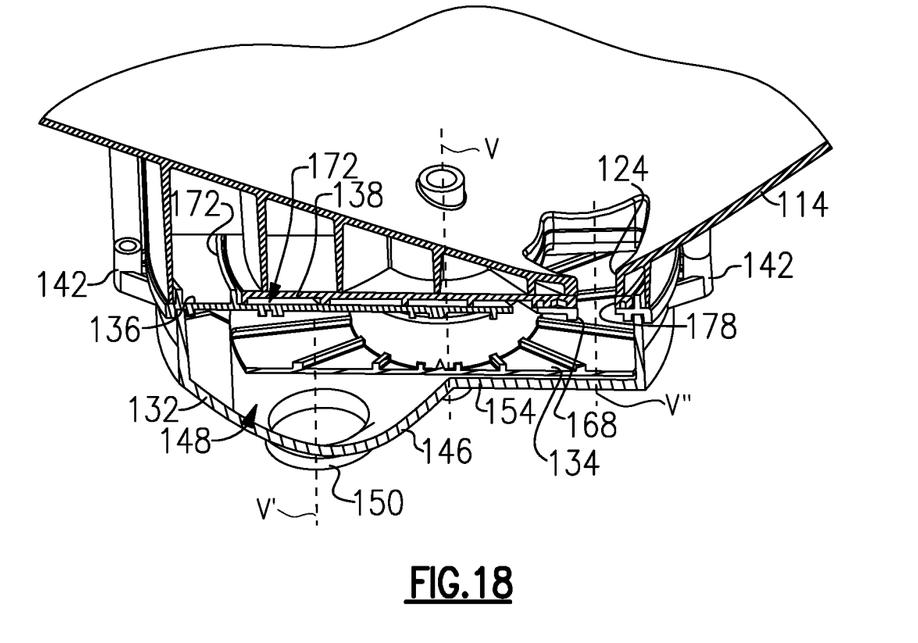
FIG. 18 is a cross section of the hopper mounted onto the funnel cover and rotary gate shown in FIG. 17.

Mounted about shaft 110 between hopper 114 and impeller 126, is controlled-release assembly 130, which generally comprises a drive housing 132, transfer wheel 134, funnel cover 136 and rotary gate 138. With additional reference to FIGS. 6 and 7, drive housing 132 defines a housing shaft aperture 129 for passage of shaft 110 therethrough, and may be securely fastened to hopper 114, such as via, for example and without limitation, fasteners 140 (see FIG. 3) within lobes 142 which are arranged around the outer periphery of drive housing 132. As shown most clearly in FIGS. 6 and 7, drive housing 132 may have an elliptical mounting sidewall 144 configured for mounting to hopper 114 and a conical funnel sidewall 146 depending downwardly from mounting sidewall 144 and defining the funnel 148. Funnel 148 defines a funnel opening 150 through which particulate matter passes to the impeller. As shown most clearly in FIG. 7, a first portion of conical funnel sidewall 146 coincides at 152 with a first portion 147 of elliptical mounting sidewall 144. As a result, the center of funnel opening 150 may be located at or proximate to a vertical axis A passing through a focus of the elliptical mounting sidewall. The remaining second portion of the conical funnel sidewall 146 is coupled to the remaining second portion of the elliptical mounting sidewall 144 by a planar bottom wall 154. Planar bottom wall 154 may be perpendicular to the elliptical mounting sidewall 144. When drive housing 132 is mounted to hopper 114, bottom planar wall 154 may be positioned directly beneath hopper opening 124 such that funnel opening 150 is laterally spaced apart from hopper opening 124. As seen most clearly in FIGS. 3 and 18, funnel opening 150 is arranged along a first vertical axis V' in spaced parallel relation with vertical axis V in a first direction while hopper opening 124 is arranged along a second vertical axis V" in spaced parallel relation with vertical axis V in a second direction.

Figure 8:
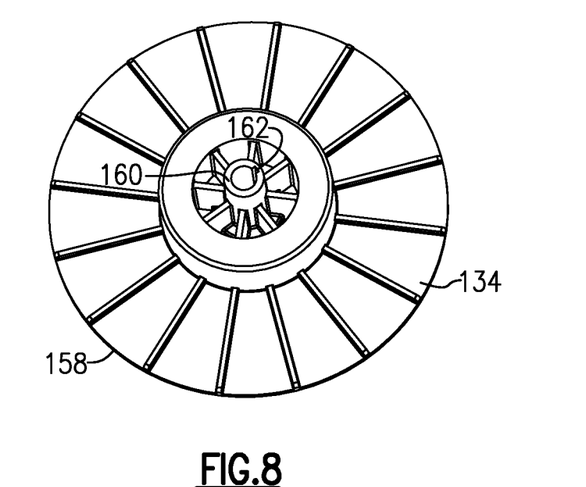
FIG. 8 is a top perspective view of a transfer wheel used within the spreader shown in FIG. 1.
Figure 16:
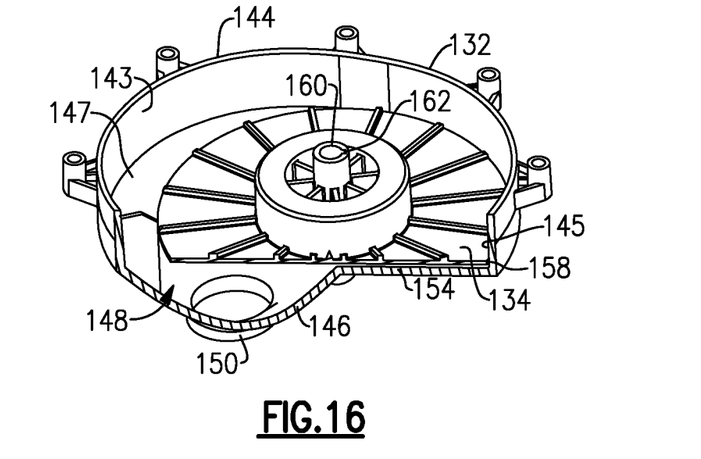
FIG. 16 is a cross section view of the transfer wheel received within the drive housing of the spreader shown in FIG. 1.
Figure 17:
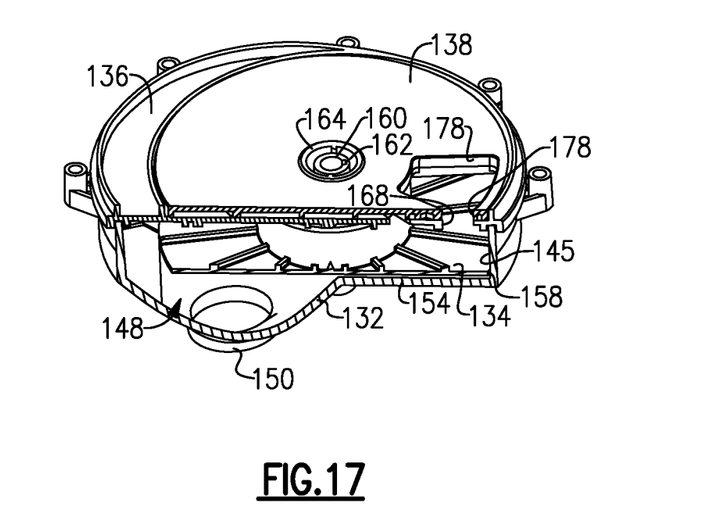
FIG. 17 is a cross section view of the funnel cover and rotary gate mounted onto the drive housing shown in FIG. 16.

Received within drive housing 132 and rotatably coupled to shaft 110 is transfer wheel 134. As shown in FIG. 8, transfer wheel 134 has a circular side edge 158 and defines a central wheel shaft aperture 160. Wheel shaft aperture 160 may include a key recess 162 whereby a complimentary shaped key located on shaft 110 (not shown) may be seated so as to rotationally couple transfer wheel 134 to shaft 110. As a result, rotation of shaft 110 causes transfer wheel 138 to rotate. With additional reference to FIG. 16, transfer wheel 134 is received within drive housing 132 such that a portion of transfer wheel 134 lies adjacent to bottom planar wall 154 with a portion of side edge 158 proximate second portion of the elliptical mounting sidewall 144. The remaining portion of transfer wheel 134 may then extend over a portion of funnel 148. Because funnel opening 150 is laterally spaced apart from hopper opening 124, as described above, particulate matter may exit hopper 114 and rest upon transfer wheel 134.

When spreader 100 is moving, shaft 110 rotates thereby rotating transfer wheel 134. Particulate matter on transfer wheel 134 rotates from hopper opening 124 over funnel 148 where it may then fall off and pass through funnel opening 150 to impeller 126 for dispersal, as described above. However, should spreader 100 be stopped, such as for a short period of time, particulate matter may accumulate on transfer wheel 134 rather than dropping onto the impeller. Thus the particulate matter does not accumulate on the ground and is not rapidly dispersed when spreader 100 resumes movement. If spreader 100 is not moved for a longer period of time, a sufficient amount of material may build up on transfer wheel 134 such that hopper opening 124 may be occluded by the accumulated material, at which point no additional particulate material would exit hopper 114 until spreader 100 is moved and shaft 110/transfer wheel 134 is rotated. In either event and in accordance with an aspect of the present invention, when spreader 100 resumes movement following a stationary period of time, the dispersal of particulate matter is mitigated by transfer wheel 134 such that only a portion of the accumulated material is dispersed as spreader 100 travels, thus preventing over-application of material to a small area.

Figure 9:
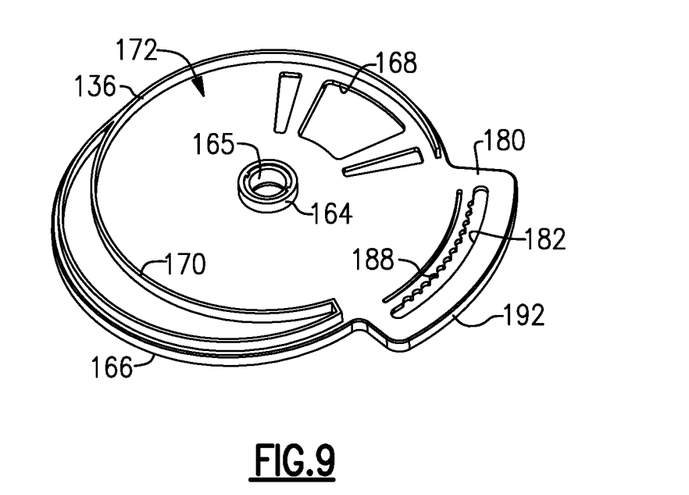
FIG. 9 is a top perspective view of a funnel cover used within the spreader shown in FIG. 1.
Figure 10:
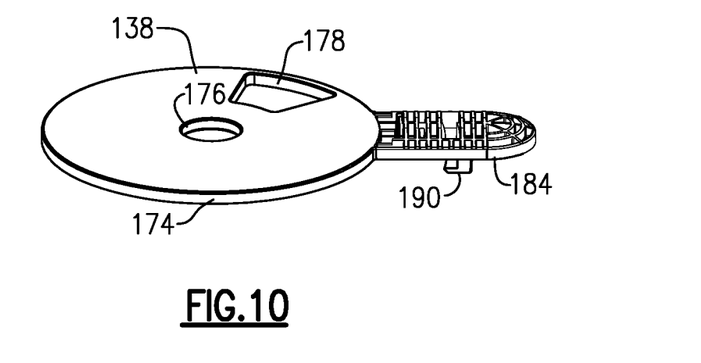
FIG. 10 is a top perspective view of a rotary gate used within the spreader shown in FIG. 1.
Figure 11:
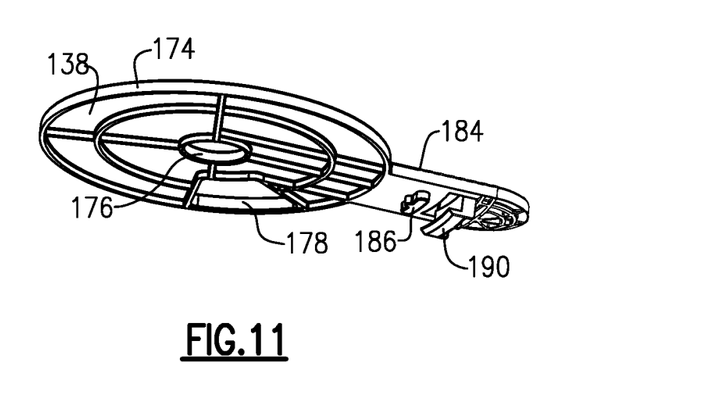
FIG. 11 is a bottom perspective view of the rotary gate shown in FIG. 10.

With additional reference to FIG. 9, drive housing 132 may be capped by a funnel cover 136 having a cover shaft wall 164 defining a cover shaft aperture 165 configured for passage of shaft 110 therethrough. Funnel cover 136 includes a generally elliptical outer wall 166 configured to overlap elliptical mounting sidewall 144 of drive housing 132. A cover opening 168 is defined within funnel cover 136 and is proportioned and positioned such that it coincides with hopper opening 124 when drive housing 132 and funnel cover 136 are secured to hopper 114 (see FIG. 18). Funnel cover 136 may also include an arcuate raised ridge 170 which defines a circular recess 172. Recess 172 is proportioned to receive rotary gate 138 therein. As shown in FIGS. 10 and 11, rotary gate 138 includes a generally circular sidewall 174 with a cover aperture 176 and gate opening 178 defined therein. Cover aperture 176 is proportioned to encircle cover shaft wall 164 whereby rotary gate 138 may freely selectively rotate within recess 172 as will be described in greater detail below.

Figure 12:
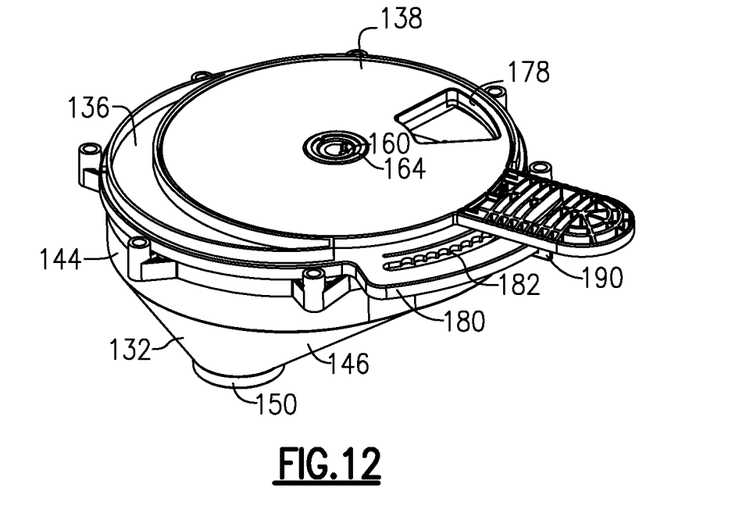
FIG. 12 is a top perspective view of a complete controlled-release assembly used within the spreader shown in FIG. 1, with the gate opening in a fully open position.
Figure 13:
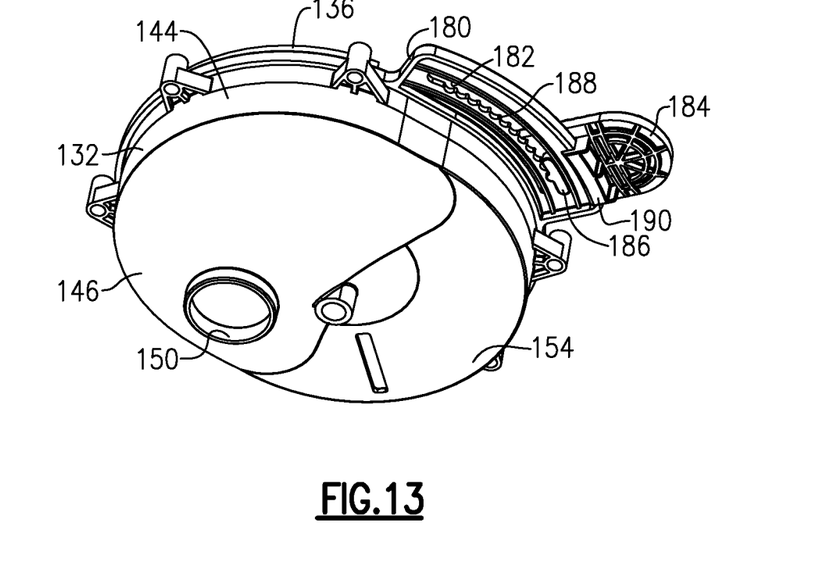
FIG. 13 is a bottom perspective view of the complete controlled-release assembly shown in FIG. 12.
Figure 14:
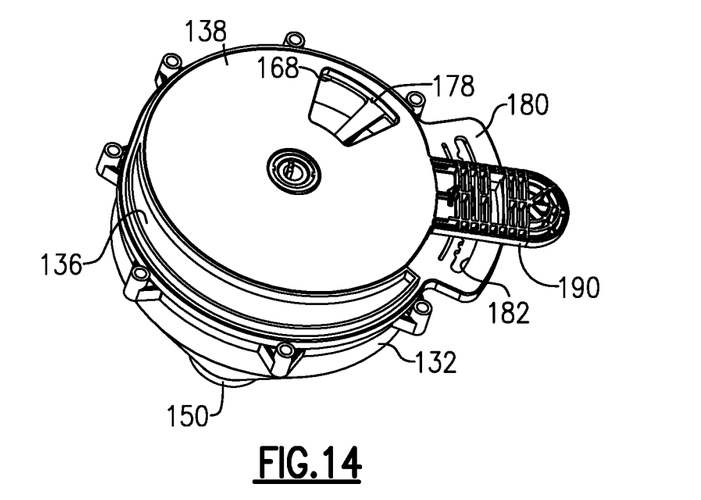
FIG. 14 is a top perspective view of the complete controlled-release assembly shown in FIG. 12, with the gate opening in a partially occluded position.
Figure 15:
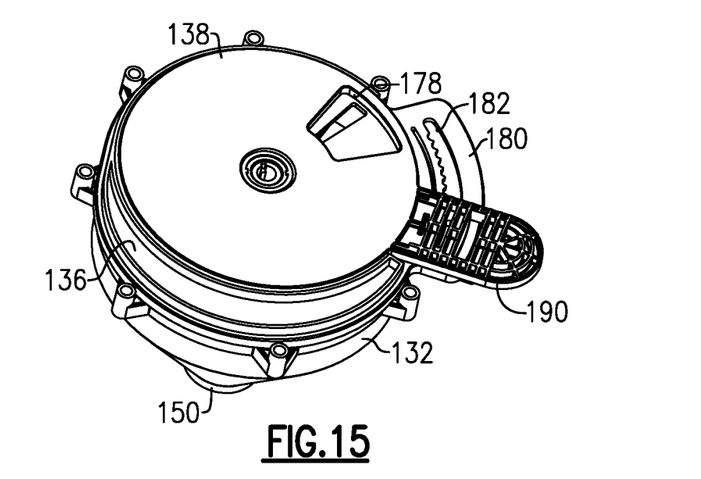
FIG. 15 is a top perspective view of the complete controlled-release assembly shown in FIG. 12, with the gate opening in a fully closed position.

With reference to FIGS. 9 through 13, funnel cover 136 may include a cover extension 180 extending outwardly from outer wall 166 and beyond elliptical mounting sidewall 144 of drive housing 132. Cover extension 180 includes a slot 182 defined therein. Rotary gate 138 includes a handle portion 184 adapted to overlap a portion of cover extension 180. Handle portion 184 includes a tab 186 configured to travel within slot 182. In accordance with an aspect of the present invention, a portion of cover extension 180 defining slot 182 may have a scalloped profile defining a plurality of notches 188. Tab 186 may then be dimensioned to selectively reside within one of the plurality of notches 188 at a time. Handle portion 184 may also carry a cover guide 190 which is configured to ride along an outer edge 192 of cover extension 180. Thus, rotary gate 138 may be selectively positionable between a fully open position, whereby gate opening 178 fully coincides with cover opening 168 and hopper opening 124 (see. FIGS. 3 and 12), and a fully closed position whereby rotary gate 138 fully occludes cover opening 168 and hopper opening 124 (see FIG. 15). Rotary gate 138 may also be selectively positionable in a partially occluded position whereby gate opening 178 partially overlaps with cover opening 168 and hopper opening 124 (see, e.g., FIG. 14). As such, rotary gate 138 may meter the amount of particulate matter emptying hopper 114 for eventual dispersion via impeller 128 as described above. Additionally, should spreader 100 be ready for storage with particulate matter remaining within hopper 114, rotary gate may be rotated to the fully closed position (FIG. 15).

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A spreader configured to disperse a particulate matter, the spreader comprising:
   a) a frame having wheels rotatably mounted on an axle;
   b) a gear assembly arranged on the axle an intermediate distance between the wheels;
   c) a shaft coupled to the gear assembly at a first end, wherein the shaft is configured to rotate about a first axis of rotation when the axle rotates about a second axis of rotation;
   d) a hopper mounted on the frame, wherein a second end of the shaft extends through a bottom wall of the hopper and terminates within a cavity defined by the hopper, and wherein the hopper is configured to hold the particulate matter whereby the particulate matter empties the hopper through a hopper opening defined within the bottom wall;
   e) an impeller mounted on the shaft between the gear assembly and the hopper, wherein the impeller is configured to receive the particulate matter emptied from the hopper; and
   f) a controlled-release assembly mounted about the shaft between the hopper and the impeller, wherein the controlled release assembly comprises:
   i) a drive housing secured to the hopper, wherein the drive housing defines a funnel having a funnel opening configured to dispense the particulate matter therethrough to the impeller, and wherein the drive housing comprises an elliptical mounting sidewall configured to mount to the hopper and a conical funnel sidewall depending downwardly from the elliptical mounting sidewall and defining the funnel, wherein a first portion of the conical funnel sidewall coincides with a first portion of the elliptical mounting sidewall, and wherein a remaining second portion of the conical funnel sidewall is coupled to a remaining second portion of the elliptical mounting sidewall by a planar bottom wall, wherein the planar bottom wall is perpendicular to the elliptical mounting sidewall; and
   ii) a transfer wheel received within the drive housing and coupled to the shaft whereby rotation of the shaft rotates the transfer wheel, wherein, when the shaft is rotating, the transfer wheel rotates whereby the particulate matter from the hopper is delivered to the funnel of the drive housing, and wherein, when the shaft is stationary, the transfer wheel is stationary whereby particulate matter from the hopper is not delivered to the funnel of the drive housing.

2. The spreader of claim 1 wherein the transfer wheel has a circular side edge and is received within the drive housing whereby a portion of the transfer wheel lies adjacent to the bottom planar wall with a portion of the side edge proximate the second portion of the elliptical mounting sidewall, and whereby a remaining portion of the transfer wheel extends over a portion of the funnel.

3. The spreader of claim 2 wherein bottom planar wall is positioned directly beneath the hopper opening and wherein the funnel opening is laterally spaced apart from the hopper opening.

4. The spreader of claim 1 wherein the first axis of rotation is perpendicular to the second axis of rotation.

5. The spreader of claim 1 wherein the controlled-release assembly further includes:
   iii) a funnel cover mounted to the drive housing and defining a cover opening therein, wherein the cover opening is configured to coincide with the hopper opening.

6. The spreader of claim 5 wherein the controlled-release assembly further includes:
   iv) a rotary gate mounted to the funnel cover and defining a gate opening therein, wherein the rotary gate is selectively positionable between a fully open position whereby the gate opening fully coincides with the cover opening and hopper opening and a fully closed position whereby the rotary gate fully occludes the cover opening and hopper opening.

7. The spreader of claim 6 wherein the rotary gate is selectively positionable in a partially occluded position whereby the gate opening partially overlaps with the cover opening and hopper opening.

8. The spreader of claim 6 wherein the funnel cover includes a cover extension configured to extend outwardly beyond a side wall of the drive housing, wherein the cover extension includes a slot defined therein, and wherein the rotary gate includes a handle portion adapted to overlap a portion of the cover extension, wherein the handle portion includes a tab configured to travel within the slot.

9. The spreader of claim 8 wherein a sidewall defining the slot has a scalloped profile defining a plurality of notches, and wherein the tab is dimensioned to selectively reside within one of the plurality of notches at a time.

10. The spreader of claim 1 further including:
    g) an agitator fixedly secured to the second end of the shaft, wherein the agitator resides within the hopper cavity and is configured to prevent agglomeration of the particulate matter within the hopper.

11. The spreader of claim 1 wherein the frame includes a hitch coupling configured to mount to a vehicle-borne receiver.

12. The spreader of claim 1 wherein the frame includes a push/pull bar configured to be grasped by a user.

* * * * *